(12) United States Patent
Allen et al.

(10) Patent No.: US 6,458,618 B1
(45) Date of Patent: Oct. 1, 2002

(54) ROBUST SUBSTRATE-BASED MICROMACHINING TECHNIQUES AND THEIR APPLICATION TO MICROMACHINED SENSORS AND ACTUATORS

(75) Inventors: Mark G. Allen, Atlanta, GA (US); Sung-Pil Chang, Atlanta, GA (US); Jeong-Bong Lee, Baton Rouge, LA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/697,212

(22) Filed: Oct. 26, 2000

Related U.S. Application Data

(62) Division of application No. 09/326,272, filed on Jun. 4, 1999.
(60) Provisional application No. 60/088,063, filed on Jun. 5, 1998.

(51) Int. Cl.[7] .............................................. H01L 21/00
(52) U.S. Cl. ......................................... 438/53; 438/456
(58) Field of Search .............................. 438/48, 51, 53, 438/455, 459, 456

(56) References Cited

U.S. PATENT DOCUMENTS

| | | | |
|---|---|---|---|
| 5,471,723 A | 12/1995 | Lüder et al. ............... 29/25.41 |
| 5,531,018 A | 7/1996 | Saia et al. ...................... 29/622 |
| 5,614,722 A | 3/1997 | Solberg et al. .............. 250/374 |
| 5,652,559 A | 7/1997 | Saia et al. ...................... 335/78 |
| 5,659,195 A | 8/1997 | Kaiser et al. ................ 257/415 |
| 5,744,780 A | 4/1998 | Chang et al. .......... 219/121.73 |
| 5,840,622 A | 11/1998 | Miles et al. ................. 438/622 |
| 5,847,631 A | 12/1998 | Taylor et al. .................. 335/78 |
| 5,867,886 A | 2/1999 | Ratell et al. ................... 29/595 |
| 5,913,134 A * | 6/1999 | Drayton ........................ 438/456 |
| 6,140,144 A * | 10/2000 | Najafi ............................ 438/53 |
| 6,146,917 A * | 11/2000 | Zhang ............................ 438/51 |
| 6,174,820 B1 * | 1/2001 | Habermahl .................. 438/745 |
| 6,189,205 B1 * | 2/2001 | Molkner ....................... 29/620 |
| 6,207,473 B1 * | 3/2001 | De Bortoli ..................... 438/53 |
| 6,210,989 B1 * | 4/2001 | Kurtz ............................. 438/51 |

* cited by examiner

Primary Examiner—John F. Niebling
Assistant Examiner—Stacy Whitmore
(74) Attorney, Agent, or Firm—Thomas, Kayden, Horstemeyer & Risley

(57) ABSTRACT

The use of robust substrates on the surface micro-machined structures combines (1) the use of micro-machining technology; (2) the use of electronic packaging technologies; and (3) the use of conventional machining techniques to create a new class of micro-machined structures. A particular robust substrate-based micro-machine structure is a capacitive pressure sensor that includes a pressure sensitive diaphragm and an electrode.

7 Claims, 4 Drawing Sheets

ROBUST SUBSTRATE-BASED MICROMACHINING TECHNIQUES AND THEIR APPLICATION TO MICROMACHINED SENSORS AND ACTUATORS

CROSS REFERENCE TO RELATED APPLICATIONS

This is a Division of application Ser. No. 09/326,272, filed Jun. 4, 1999.

The present application claims priority to and the benefit of the filing date of Provisional Patent Application Ser. No. 60/088,063 filed Jun. 5, 1998, entitled "Robust-Substrate-Based Micro-machining Techniques and Their Application to Micro-machined Sensors And Actuators," which, in its entirety, is hereby incoporporated by reference in this application.

FIELD OF THE INVENTION

The present invention generally relates to the field of integrated circuits, and in particular to robust substrate-based micromachined devices.

BACKGROUND OF THE INVENTION

As known in the art, micro-fabrication processes are utilized to construct miniature devices that can be batch fabricated at a relatively low cost. In this regard, multiple devices are typically manufactured on a single wafer during micro-fabrication. Well known micro-fabrication techniques are used to form similar components of the multiple devices during the same manufacturing steps. Once the multiple devices have been formed, they can be separated into individual devices. Examples of micro-fabrication techniques that allow the batch fabrication of multiple devices include, but are not limited to, sputtering, evaporation, etching, electroforming (e.g., electroplating, electrowinning, electrodeposition, etc.), packaging techniques (e.g., lamination, screen printing, etc.), photolithography, and thick or thin film fabrication techniques. Since a large number of devices can be formed by the same micro-fabrication steps, the cost of producing a large number of devices through microfabrication techniques is less than the cost of serially producing the devices through other conventional techniques. It is therefore desirable, in many applications, to fabricate devices through micro-fabrication techniques.

Micro-machining is a new technology used to realize microstructures by exploiting common micro-fabrication techniques, e.g., integrated circuit processing technologies. Various microstructures (in particular, miniaturized sensors and actuators) have been realized using this technology; for example, accelerometers, pressure sensors, air flow sensors, micromotors, and micropumps. Since the root of micro-machining technology is in integrated circuit processing technology, micro-machined devices have been primarily realized using silicon substrates. In many applications, the use of traditional silicon-substrate in micro-machined devices may be limited. One limitation for example, is the lack of ability of a surrounding silicon substrate to absorb large mechanical shocks and forces in a harsh environment. Another limitation is the difficulty is interfacing silicon electronics to micro-machined devices using packaging techniques. Thus, heretofore unaddressed needs exists in the industry to address the aforementioned deficiencies and inadequacies.

SUMMARY OF THE INVENTION

As will be explained more fully hereinafter, the present invention is the application of robust substrates for both bulk and surface micromachined structures, as well as forming essential structural components of the device package on the robust substrates.

In particular, the use of robust substrates in the surface micro-machined structures described herein is unique in that it combines (1) the use of micro-machining technology (such as film deposition and etching, substrate etching, electroplating, lithography, etc.); (2) the use of electronic packaging technologies (such as screen printing, lamination, chip assembly, etc.); and (3) the use of conventional machining techniques (e.g., drilling, polishing, etc.) to create a new class of micro-machined structures.

These new structures have numerous advantages including low cost, large area fabrication, co-fabrication of micro-machined devices and their packages, and incorporation of new materials into micro-machined systems. Furthermore, structures that are impractical to fabricate using solely traditional micro-machining techniques are now possible.

To maintain robustness, in a preferred embodiment of the invention, metal micro-machined devices use metal shim stock and electroplating technology to fabricate the devices. Many metal shim stocks with appropriate thickness can be good candidates for robust-substrate-based micro-machining.

As mentioned above, one of the advantages of the use of a robust substrate is the possibility of the co-fabrication of a package and micro-machined device using the robust substrate as both a substrate and package.

Another advantage is the robustness of the robust substrate based micro-machined devices. These robust micro-machined devices have the potential to be used in mechanically harsh environments.

In an alternative embodiment, a sensor is fabricated using the robust substrate. The robust substrate based pressure sensor is fabricated using micro-machining technology in combination with conventional machining. In particular, a robust substrate based pressure sensor is fabricated using stainless steel as a substrate, Kapton™ polyimide film as a pressure-sensitive diaphragm, and electroplated nickel as a back electrode.

Other features and advantages of the present invention will become apparent to one with skill in the art upon examination of the following drawings and detailed description. It is intended that all such additional features and advantages be included herein within the scope of the present invention.

DETAILED DESCRIPTION OF THE PREFERRED EMBODIMENTS

Figure 1A:
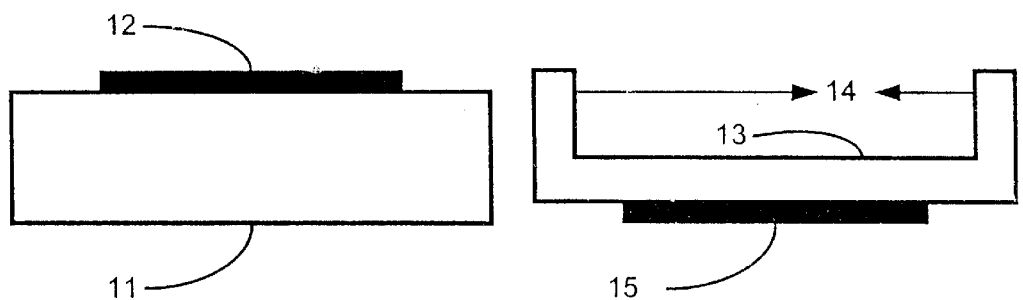
FIGS. 1A & 1B are cross-sectional views of the formation of electronics on a flat substrate and a machined substrate, which have microstructures, and bonding of the two substrates to form a micro-machined device.

With reference now to the drawings wherein like reference numerals designate corresponding parts throughout the several views, a preferred embodiment of the present invention is a robust substrate micro-machined device fabricated using a combination of micro-machining technology, electronic packaging, and conventional fabrication technology. The robust substrate micro-machined devices include for example, accelerometers, pressure sensors, air flow sensors, actuators, micromotors, and micropumps Many types of metal can be formed into shim stocks having an appropriate thickness for use in robust-substrate-based micro-machining. They can be used for both bulk and surface micro-machining. In traditional silicon micro-machining, bulk micro-machining is a process technique to sculpt microstructures using wet (potassium hydroxide [KOH], ethylene-diamine and pyrocatecol [EDP], and hydrazine) and dry (reactive ion etch) etching techniques in conjunction with etch masks and etch stops. Surface micro-machining is a technique useful when building free standing microstructures using sacrificial layers (PSG-polysilicate glass, polyimide, photoresists), which are dissolved away by a dry or wet chemical etchant that does not attack the structural parts. The building of free standing microstructures is further described in U.S. Pat. No. 5,847,631, entitled "MAGNETIC RELAY SYSTEM AND METHOD CAPABLE OF MICROFABRICATION PRODUCTION" which is herein incorporated by reference.

Illustrated in FIGS. 1(A &B), are cross-sectional views depicting the robust-substrate-based bulk micro-machining technique of the preferred embodiment. In the first step, electronics packages 12 and 15 are framed on a flat substrate 11 and machined substrate 13 respectively, which have microstructures. In the bulk micro-machining using robust substrates, conventional machining tools can be used to create holes and pits to sculpt microstructures, such as pit 14 in the machined substrate 13. Possible candidates for conventional machining tools include milling machines and electro-discharge machining (ESD). Wet chemical etchants are also possible candidates for creating bulk micro-machined microstructures.

Figure 1B:
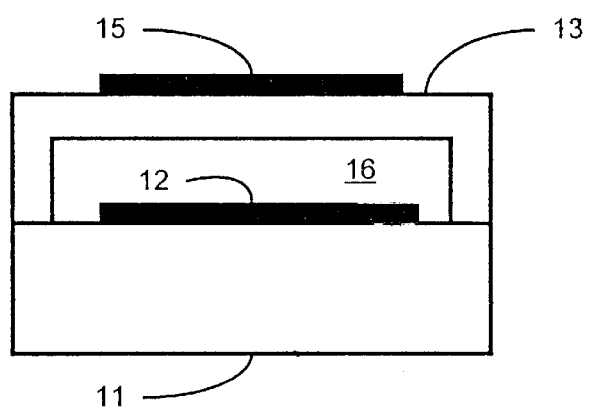
Figure 2A:
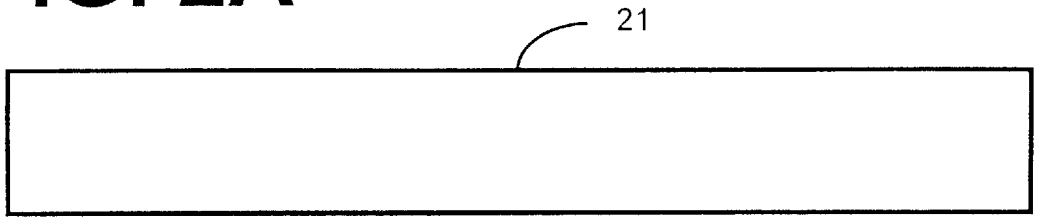
FIGS. 2A–2D are cross-sectional views of the formation of a micro-machined device on a robust substrate using a robust-substrate-based surface micro-machining technique.
Figure 2B:
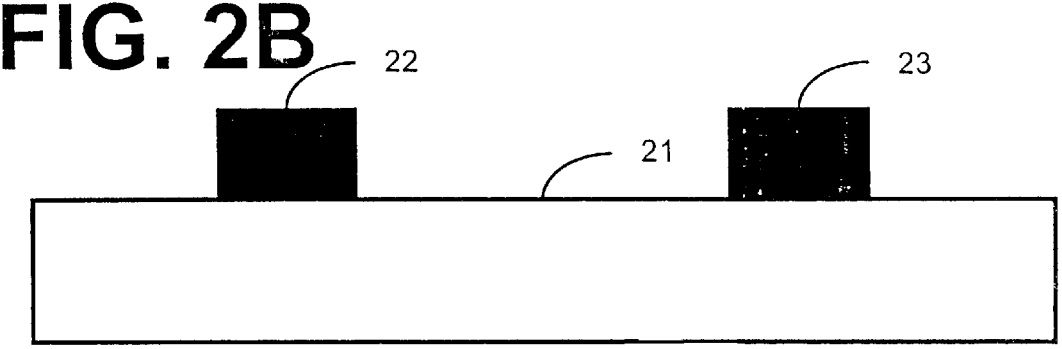
Figure 2C:
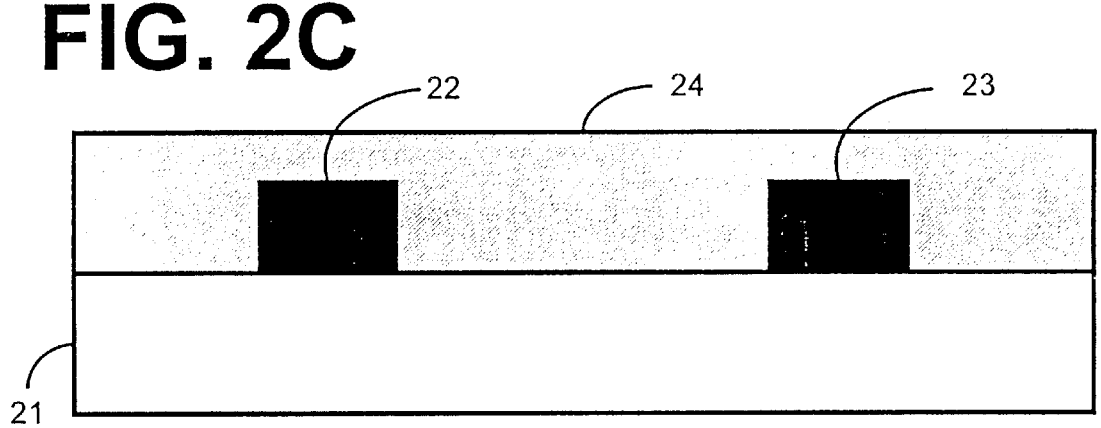
Figure 2D:
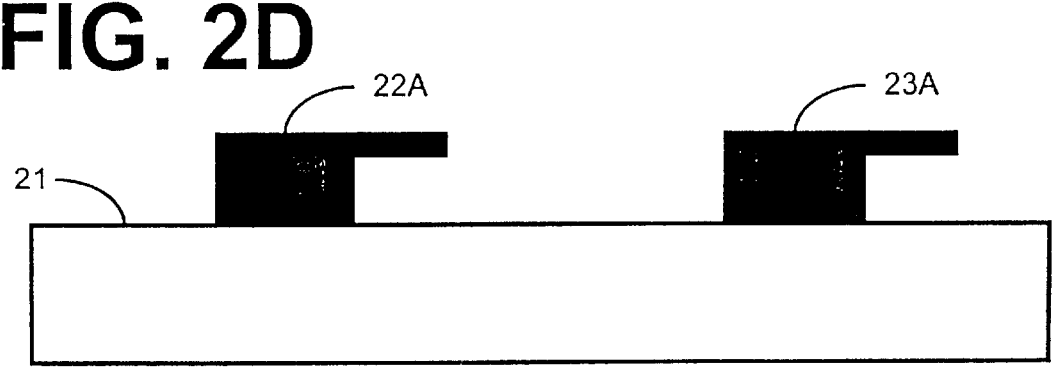

As shown in FIG. 1B, the two substrates 11 and 13 are bonded together to form micro-machined devices. Subsequent bonding techniques, such as lamination, can create a robust bulk micro-machined device which may not require external packaging.

Illustrated in FIGS. 2(A–D), are block diagrams illustrating the building of surface micro-machined devices using robust substrates. First, a robust substrate 21 is obtained. Next is the formation of bottom microstructures 22 and 23 as shown in FIG. 2B. The deposition of sacrificial layer(s) 24 is shown in FIG. 2C. The formation of top microstructures 22A and 23A is accomplished with the removal of the sacrificial layer(s) 24. Since the robust substrates are used as substrates, wet and dry etchants and other chemicals used for subsequent processing should be selected so as not to attack robust substrates or the substrates should be protected with suitable materials.

Among many possible micro-machined accelerometers, pressure sensors, air flow sensors, micromotors, and micropumps and/or actuators fabricatable using robust substrate-based micro-machining, a surface micro-machined capacitive pressure sensor has been chosen for the illustration of these principles.

Figure 3:
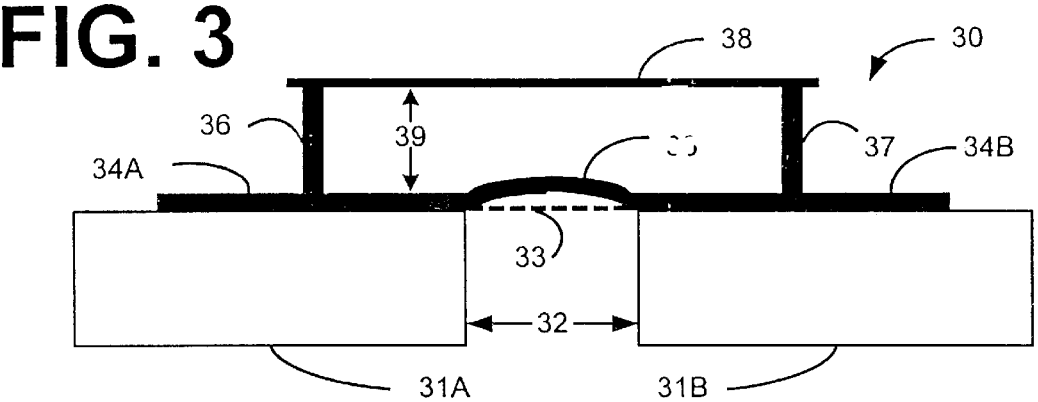
FIG. 3 is a schematic diagram of the cross-sectional view of the micro-machined capacitive pressure sensor on a robust substrate.

Illustrated in FIG. 3, is a schematic diagram of the cross-sectional view of a capacitive pressure sensor 30. The capacitive pressure sensor 30 is based on the pressure-induced deflection of a metallized diaphragm 35 and the subsequent measurement of the capacitance between this deflecting diaphragm 35 and a fixed surface micro-machined backplate 38 suspended over the diaphragm 35. The capacitive pressure sensor 30, has an initial gap distance 39 between the micro-machined backplate 38 and the deflecting diaphragm 35. The pressure is determined from the change in the capacitance of the capacitive pressure sensor 30. The change in the capacitance is caused by the deflection of the diaphragm 35 at the center from the point of origin 33. This deflection is caused by the applied pressure on the diaphragm 35 through the inlet hole 32. The thickness and material of the deflecting diaphragm 35 determines the minimum and maximum pressure range of the capacitive pressure sensor 30.

In another preferred embodiment, a capacitive pressure sensor 30 is fabricated using stainless steel as a substrate 31(A & B), Kapton™ polyimide film (Dupont HN 200) as a pressure-sensitive diaphragm 35, and electroplated nickel as a back electrode 38. The fabrication techniques for the capacitive pressure sensor 30 are especially suited for circuit integration, since the electronic packaging techniques used in its fabrication also allow definition and integration of externally fabricated silicon chips using various known chip-attach techniques.

Figure 4A:
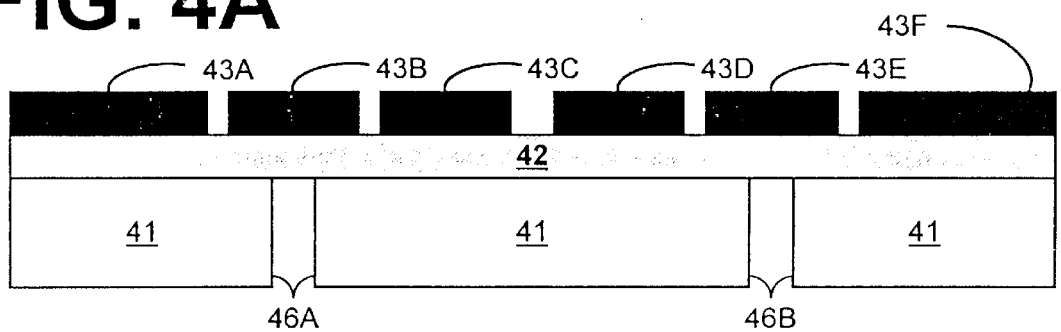
FIGS. 4A–4C are schematic diagrams of a fabrication sequence for a robust capacitive pressure sensor array.
Figure 4B:
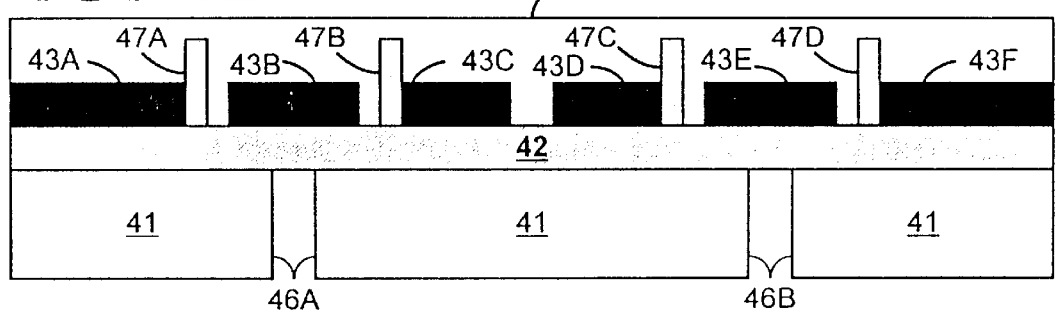
Figure 4C:
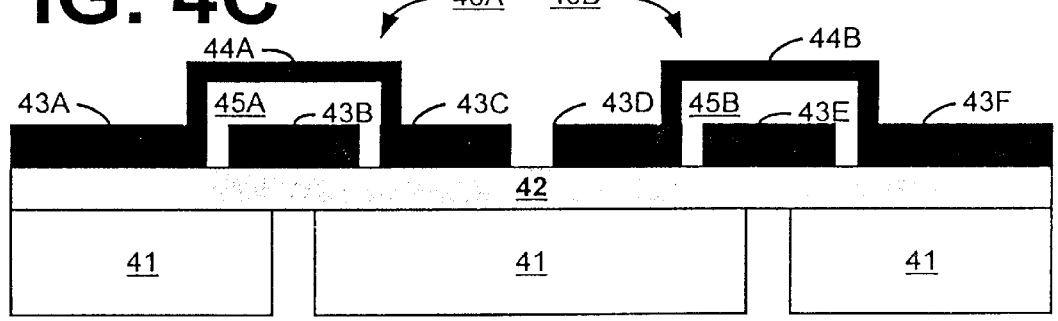

Illustrated in FIGS. 4(A–C), is a fabrication sequence of the robust capacitive pressure sensors 40(A & B). The process begins with milling an array of pressure inlet holes 46 in a stainless steel shim stock 41. Lamination of a film 42 on the stainless steel stock 41 is performed. The regions of the film 42 over the pressure inlet holes 46(A & B) will form the pressure-sensitive diaphragms 35 (FIG. 3). A metallic layer 43 is deposited on the surface of the film 42 and patterned to form bottom electrodes, bonding pads, and electroplating seed layers 43(A–F) for backplate posts Multiple layers of a polylmide 44 are coated on the patterned metallic layer 43(A–F), hard cured and dry etched to form plating molds. A metal layer is applied to form backplate posts 47(A–D). Another metallic seed layer is deposited and patterned as electroplating molds for the fixed backplates 44(A & B). Then the backplates 44(A & B) are formed and the molds and metallic seed layers are removed.

Finally, a dry etch process is performed to remove the polylmlde molds for backplate posts 47(A–D) and polyimide sacrificial layers to create air cavities 45(A & B) between the fixed backplates 44(A & B) and the pressure sensitive diaphragms.

In another preferred embodiment, the milling comprises an 8×8 array of pressure inlet holes 46 that are approximately 2 mm in diameter. It is preferred that the stainless steel shim stock is approximately 0.5 mm thick, and approximately 2¼ inch on a side. The lamination of the film on the stainless steel can be a Dupont Kapton™ HN200 (50 microns thick) polylmide film that is applied using a hot press. The metallic layer 43 of Ti/Cu/Ti is deposited on the surface of the Kapton™ film and patterned using a lift-off technique to form bottom electrodes 43B and 43E, bonding pads 43(A, C, D & F), and electroplating seed layers for backplate posts 47(A–D).

The multiple layers coating the patterned metallic layer are preferably Dupont polylmide P12611. The multiple layer coating is hard cured (resulting in a final thickness of about 36 microns), and is anisotropically dry etched using reactive ion etching to form plating molds. The metal layer applied to form backplate posts is preferably nickel that is electroplated through the polyimide molds to form the backplate posts. The other metallic seed layer molds for the fixed backplates are preferably another Ti/Cu/Ti metallic layer that is deposited and thick photoresist (Shipley PR 5740) used for a pattern for the fixed backplates. The backplates are preferably electroplated nickel that is approximately 15 microns thick. The dry etch process is an isotropic dry etch process performed using a barrel plasma etcher (a gas mixture of O2 and CF4).

Figure 5:
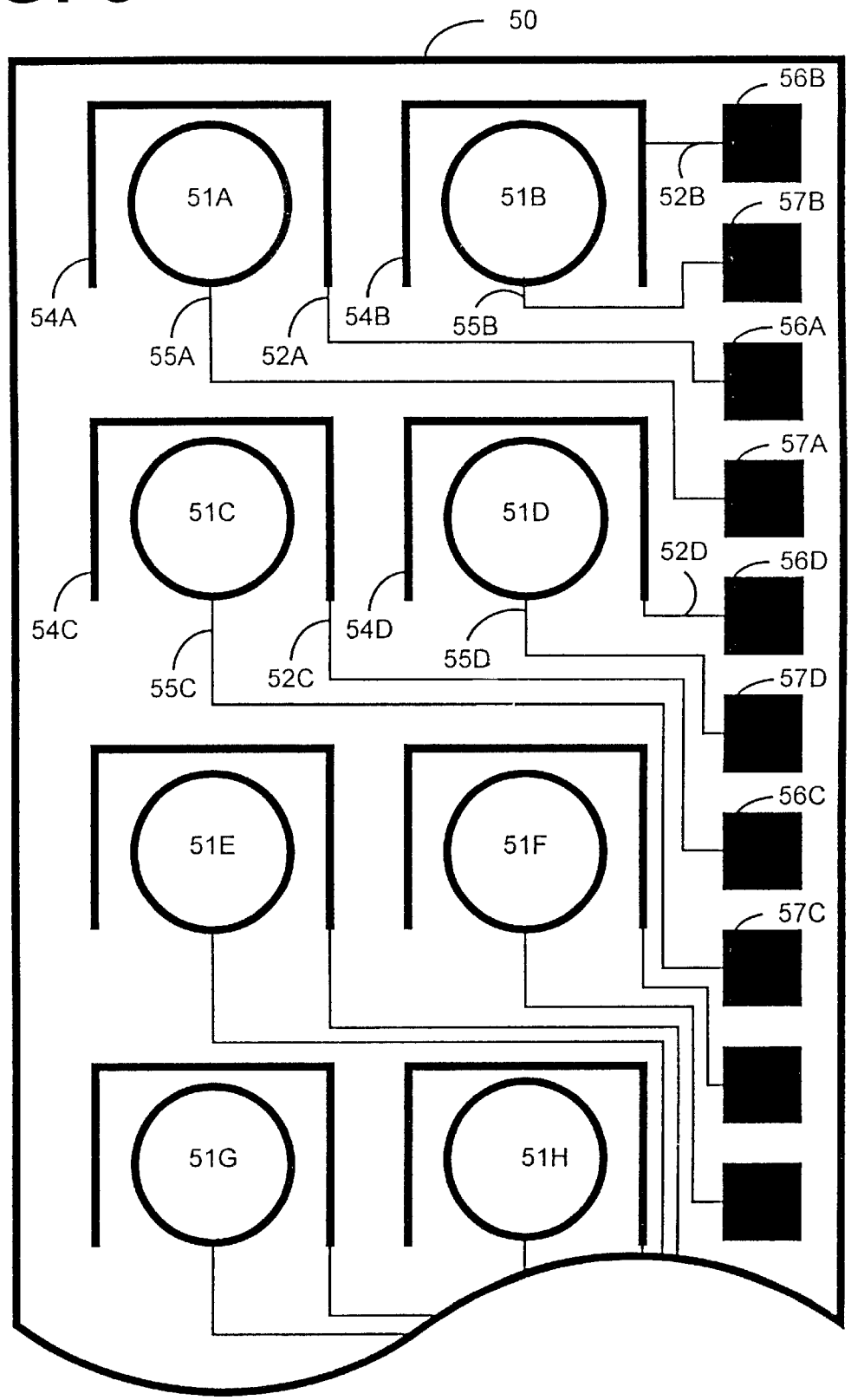
FIG. 5 is a plan-view of the electrical corrections for the micro-machined capacitive pressure sensor array fabricated in FIG. 4A.

Illustrated in FIG. 5, is a top view of FIG. 4A illustrating the electrical connections to array 50 including a multiplicity of robust capacitive pressure sensors 30. The pressure sensitive diaphragms 51 and the foundation for capacitive backplate posts 47(A&D) (FIG. 4B) are connected to the electrodes 56(A–D) and 57(A–D). These electrodes allow the robust capacitive pressure sensors 30 to conduct electrical signals to meters that can measure the capacitance of the device to determine the amount of supplied pressure. Alternatively, these electrodes can conduct electrical signals to pads suitable for surface mounting for flip-chip integration of electronic circuitry.

While specific apparatus arrangements for implementing a robust capacitive pressure sensor in accordance with the present invention are described, it should be understood that alternative apparatus arrangements are anticipated. Furthermore, it will be obvious to those skilled in the art that many variations and modifications may be made to the preferred embodiments as described above without substantially departing from the spirit and scope of the present invention. It is intended that all such variations and modifications be included within the scope of the present invention, as set forth in the following claims.

What is claimed is:

1. A process for constructing a robust substrate-based micromachined device, comprising the steps of:

machining a first microstructure into a stainless steel shim stock;

laminating a film onto said stainless steel stock;

depositing on said film a first metallic layer;

patterning said first metallic layer to form a second microstructure;

dry etching said second microstructure to form a third microstructure;

depositing a second metal layer to form a fourth microstructure;

depositing a third metal layer to form a fifth microstructure; and dry etching said second metal layer and said third metal layer to form a final microstructure.

2. The process of claim 1, wherein said machining a first microstructure into a stainless steel shim stock step further comprising the step of:

milling an array of pressure inlet holes on said stainless steel shim.

3. The process of claim 2, wherein said laminating a film step further comprising the step of:

laminating a polylmide film on said stainless steel shim using a hot press.

4. The process of claim 2, wherein said patterning said first metallic layer step further comprising the step of:

patterning said first metallic layer using a lift-off technique.

5. The process of claim 2, wherein said dry etching said second microstructure to form a third microstructure step further comprising the steps of:

coating said second microstructure;

hard curing said coated second microstructure; and dry etching said coated second microstructure using reactive ion etching to form plating molds.

6. The process of claim 2, wherein said depositing a second metal layer to form a fourth microstructure step, further comprising the steps of:

forming backplate posts with nickel that is electroplated through the plating molds.

7. The process of claim 2, wherein said depositing a third metal layer to form a fifth microstructure step, further comprising the steps of:

creating a mold for a fixed backplate;

depositing nickel to form said fixed backplate; and wherein said dry etching said second metal layer and said third metal layer to form a final microstructure step is an isotropic dry etch process.

* * * * *

UNITED STATES PATENT AND TRADEMARK OFFICE
CERTIFICATE OF CORRECTION

PATENT NO.    : 6,458,618 B1 Page 1 of 1
DATED         : October 1, 2002
INVENTOR(S)   : Allen et al.

It is certified that error appears in the above-identified patent and that said Letters Patent is hereby corrected as shown below:

<u>Title page,</u>
Item [57], ABSTRACT,
Line 1, after "on", delete "the".

<u>Column 2,</u>
Line 65, after "electrical", delete "corrections" and replace with -- connections --.

<u>Column 3,</u>
Line 35, after "In", delete "the".

<u>Column 4,</u>
Line 36, after "posts", insert ".".
Line 37, after "a", delete "polylmide" and replace with -- polymide --.
Line 45, delete "polylmlde" and replace with -- polymide --.
Line 45, after "and", delete "polyimide" and replace with -- polymide --.
Line 55, after "this)", delete "polylmide" and replace with -- polymide --.
Line 62, after "Dupont", delete polylmide P12611" and replace with
-- polymide PI2611 --.

<u>Column 5,</u>
Line 35, delete "micromachined" and replace with -- micro-machined --.

<u>Column 6,</u>
Line 14, after "a", delete "polylmide" and replace with -- polymide --.

Signed and Sealed this

Twenty-first Day of January, 2003

JAMES E. ROGAN
*Director of the United States Patent and Trademark Office*